United States Patent
Yang et al.

(10) Patent No.: US 6,864,922 B2
(45) Date of Patent: Mar. 8, 2005

(54) METHOD AND SYSTEM FOR PERIODICALLY DISPLAYING A CLOCK ON A VIEWING SCREEN

(75) Inventors: Hong Yang, San Diego, CA (US); Jenny Su Chow, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 503 days.

(21) Appl. No.: 09/781,778

(22) Filed: Feb. 12, 2001

(65) Prior Publication Data

US 2002/0113894 A1 Aug. 22, 2002

(51) Int. Cl.[7] .............................................. H04N 5/262
(52) U.S. Cl. ...................... 348/564; 348/564; 348/589; 345/23
(58) Field of Search ............................... 348/564, 563, 348/565, 553, 569, 589; 345/23–26, 902

(56) References Cited

U.S. PATENT DOCUMENTS

| | | | | | |
|---|---|---|---|---|---|
| 4,004,085 A | * | 1/1977 | Makino et al. | ............. | 340/324 |
| 4,821,102 A | * | 4/1989 | Ichikawa et al. | ........... | 348/589 |
| 5,477,508 A | * | 12/1995 | Will | ............................ | 368/189 |
| 5,488,426 A | * | 1/1996 | Pack | ........................... | 348/569 |
| 5,543,857 A | * | 8/1996 | Wehmeyer et al. | ......... | 348/589 |
| 5,825,353 A | * | 10/1998 | Will | ............................ | 345/184 |
| 6,429,840 B1 | * | 8/2002 | Sekiguchi | ..................... | 345/88 |

* cited by examiner

*Primary Examiner*—Michael H. Lee
*Assistant Examiner*—Paulos M Natnael
(74) *Attorney, Agent, or Firm*—Thomas F. Lebens; Fitch, Even, Tabin & Flannery

(57) ABSTRACT

A periodic clock display method and system for a viewing device, such as a television set. A clock is displayed on a viewing device according to a first time interval and a second time interval. The first time interval determines how long the viewing device displays the clock. After the first time interval is finished, the clock is removed from the viewing device. The second time interval determines how long the clock remains off the viewing device. When the second time interval is complete, the clock is again displayed on the viewing device for the duration of the first time interval. This continues indefinitely until the user turns the periodic clock display function off.

9 Claims, 5 Drawing Sheets

METHOD AND SYSTEM FOR PERIODICALLY DISPLAYING A CLOCK ON A VIEWING SCREEN

BACKGROUND OF THE INVENTION

1. Field of the Invention

The present invention relates generally to the field of viewing devices, and more particularly to a method and system for periodically displaying a clock on a viewing device.

2. Description of the Related Art

Many viewing devices, such as televisions or computer monitors, are manufactured with an integrated clock display. Typically, the clock is displayed after some action is taken by the user, such as changing the channel on the television. Other devices, like a computer, typically display a clock whenever the device is on.

In the case of a television clock display, the user must take some action to check the time. If the user watches the same channel for a long period of time, the user might lose track of time and miss appointments or other shows of interest. If the user wants to check the time, the user must look at a nearby clock, which might require leaving the area, or the user must manually bring up the television clock display.

A clock that is always present, such as that on a computer display, takes up space on the viewing screen. Also, the clock is necessarily always present, even when the user does not want to know the time. The dedicated space that is wasted could be better used by icons or other display items that might be more useful to the user. Thus, there is a need in the art for a clock that is displayed on a viewing device according to the user's desires without wasting dedicated space on the viewing device, or requiring extra effort by the user to view the time.

SUMMARY OF THE INVENTION

In general, the present invention is a periodic clock display method and system for a viewing device, such as a television set. The present invention includes a method and a system for displaying a clock on a viewing device according to a first time interval and a second time interval. The first time interval determines how long the viewing device displays the clock. After the first time interval is finished, the clock is removed from the viewing device. The second time interval determines how long the clock remains off the viewing device. When the second time interval is complete, the clock is again displayed on the viewing device for the duration of the first time interval. This continues indefinitely until the user turns the periodic clock display function off.

In one embodiment of the present invention, the user is only allowed to turn the periodic clock display function on or off. When the clock display function is on, the viewing device displays the clock according to preset first and second time intervals. In an alternative embodiment, the user is given more flexibility by providing selection options to allow the user to select the first and second time intervals according to the user's needs. Also, instead of personalizing the options, the user may select a default option, where the first and second time intervals are preset. Other options for the clock display function may include, but are not limited to: selecting an analog or digital clock display, modifying the size or shape of the clock display, or changing where the clock is positioned. Thus, the user is able to periodically view the clock while using the viewing device, without wasting viewing space or requiring extra effort to check the time. According to the present invention, the clock display function may be implemented in a set-top decoder box.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a method and system for periodically displaying a clock on a viewing screen. Any and all such modifications, equivalents and alternatives are intended to fall within the spirit and scope of the present invention.

Figure 1:
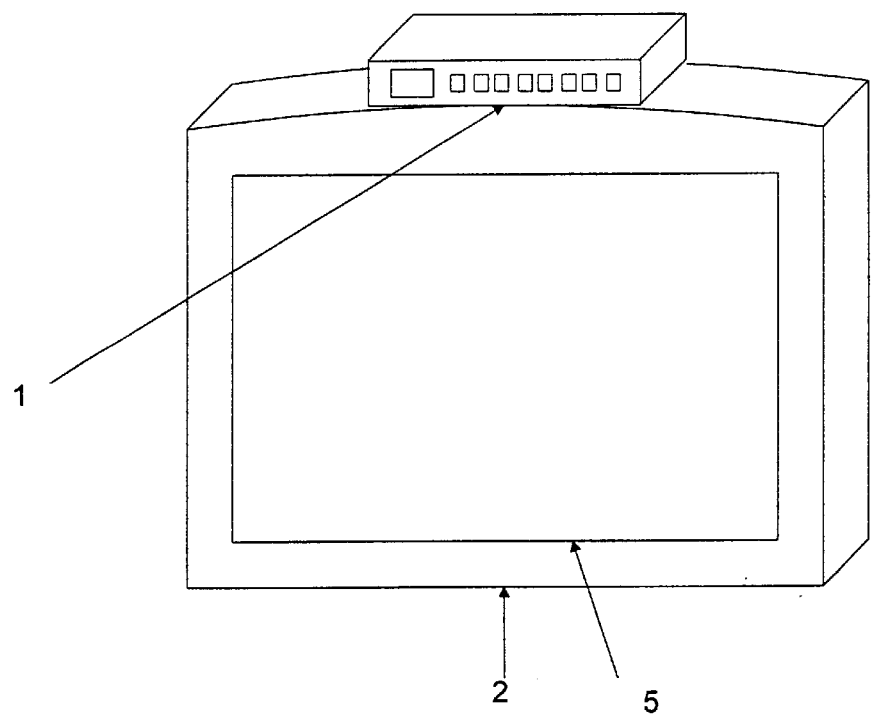
FIG. 1 illustrates a set-top box used with a television set and remote control.
Figure 1:
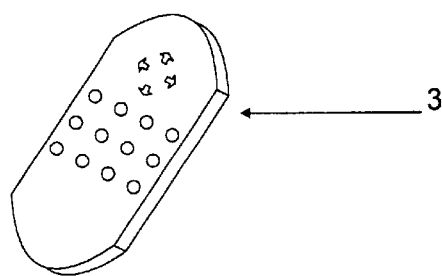

FIG. 1 illustrates a preferred embodiment of the present invention. In this embodiment, a set-top box 1 receives and decodes an antenna, cable, or satellite television signal for a television set 2 (this also could be a computer monitor, or any other type of viewing device). A user views television programs on the television screen 5 and controls the set-top box 1 by way of a remote control device 3.

Figure 2:
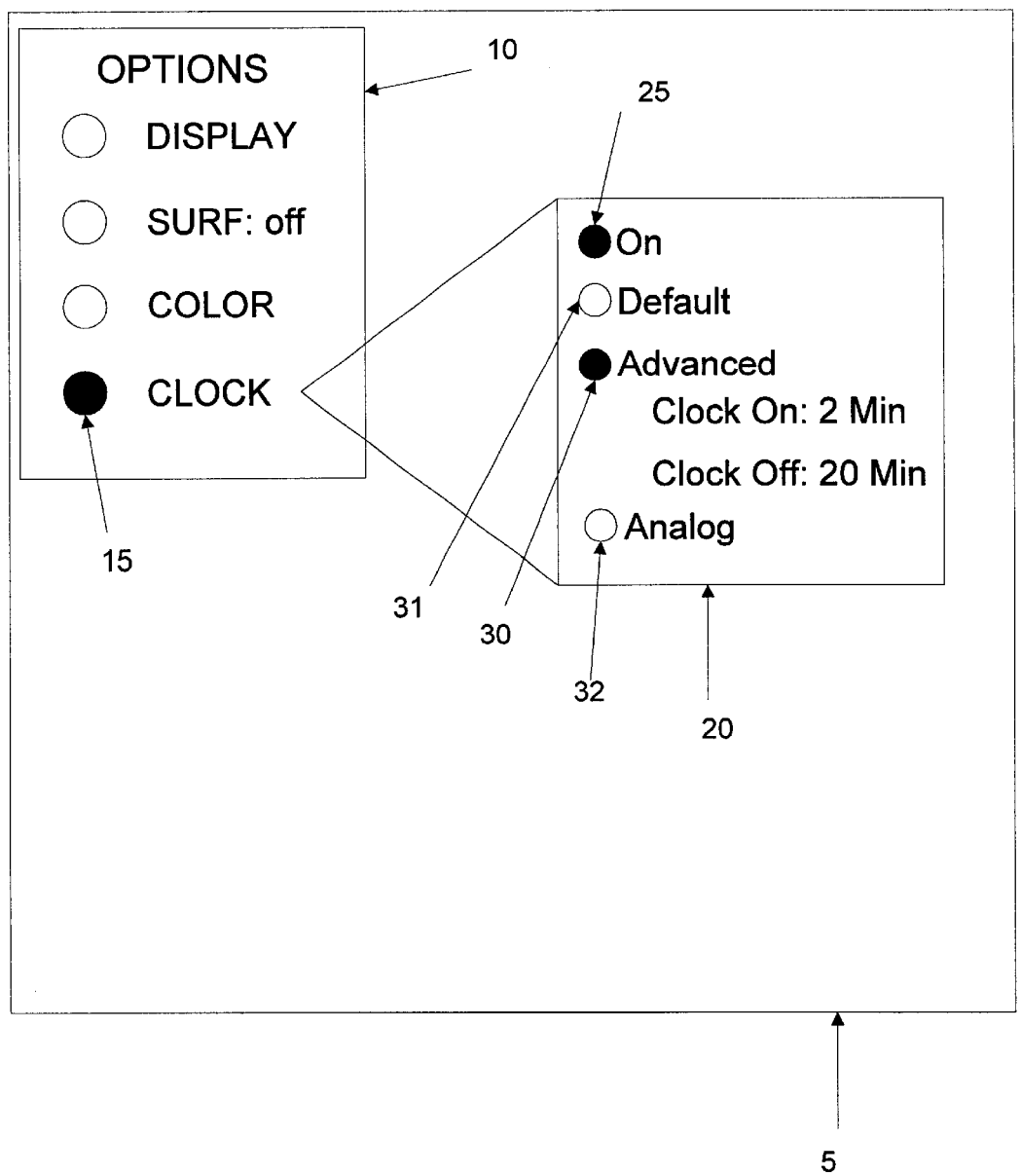
FIG. 2 is an illustration of a periodic clock display menu and the selected user options according to the present invention.

The periodic clock display function according to the present invention is illustrated in FIG. 2. Here a user has accessed an options menu 10 on a viewing screen 5. Typically, the user will use a remote control, computer, set-top box, or buttons on the television or other viewing device to access the options menu 10. Here, the user selects a clock option 15 to personalize the periodic clock display function according to the user's desires. When the clock option 15 is selected, a clock menu 20 appears containing options for the clock display function. The menu 20 contains an on/off toggle 25, default setting 31, advanced setting 30, and an analog setting 32.

In this example, the user turns the clock display function "on" 25 and chooses the advanced settings 30. Here, the first time interval is labeled "Clock On" and the second time interval is labeled "Clock Off". "Clock On" is defined as the amount of time the viewing device displays the clock and "Clock Off" is defined as the amount of time the clock will not be displayed after the clock is removed from the viewing screen. Of course, there are other possible labels and definitions for the first and second time intervals that will be obvious to those skilled in the art. The user is allowed to modify the first and second time intervals of the clock display function at anytime by changing the advanced settings 20. In this example, the user selects a first time interval of two minutes and a second time interval of twenty minutes. Because the analog setting 32 is not selected, the clock will be displayed in digital format.

Figure 3:
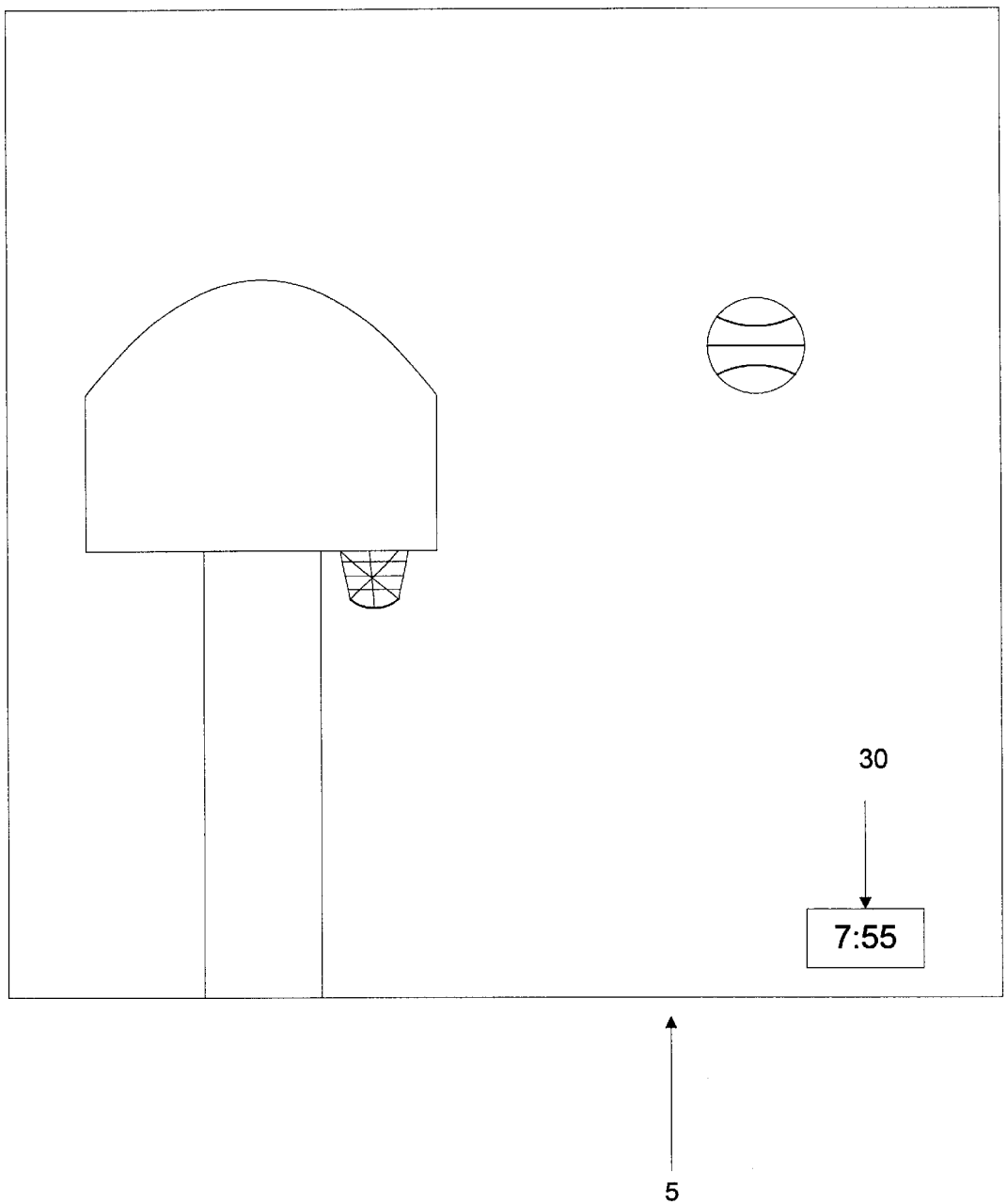
FIG. 3 illustrates a digital clock displayed on a television set.

Referring now to FIG. 3, a digital clock 40 is illustrated on the viewing screen 5 during normal television viewing. According to this example, the digital clock 40 remains on the viewing screen 5 for two minutes. The digital clock 40 is then removed from the viewing screen 5. Twenty minutes later, the digital clock 40 reappears to remind the user of the time. This process continues during normal viewing, until the settings for the clock display function are changed. The settings are stored while the viewing device is off, thus preserving the user's clock display selection. Storage of the settings may occur in the television, set-top box, computer, or remotely through the Internet and a remote server. Thus, the user is able to periodically view the clock without viewing interruption and without wasting space on the viewing device.

Figure 4:
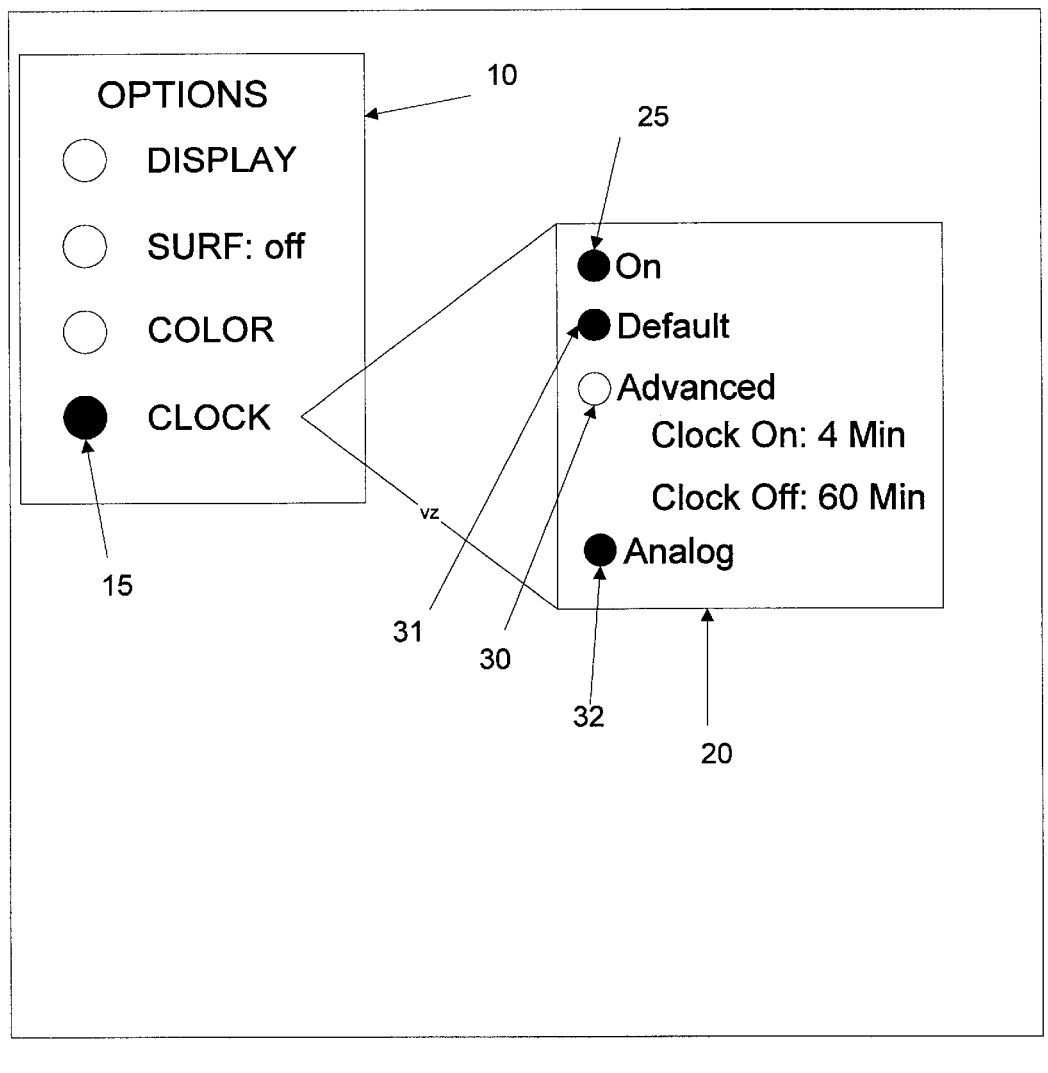
FIG. 4 is another illustration of a periodic clock display menu where a user has selected different options.

Another embodiment of the present invention is illustrated in FIG. 4. In this case, the user has previously selected a first time interval of four minutes and a second time interval of sixty minutes. Further, the user selects the default setting 31 and the analog setting 32. According to one implementation of the present invention, the default setting 31 is set to a first time interval of five minutes and a second time interval of thirty minutes. Of course, the default setting 31 may be preset to any first and second time interval. The default setting 31 allows the user to turn on the periodic clock display function without setting the first and second time intervals.

Figure 5:
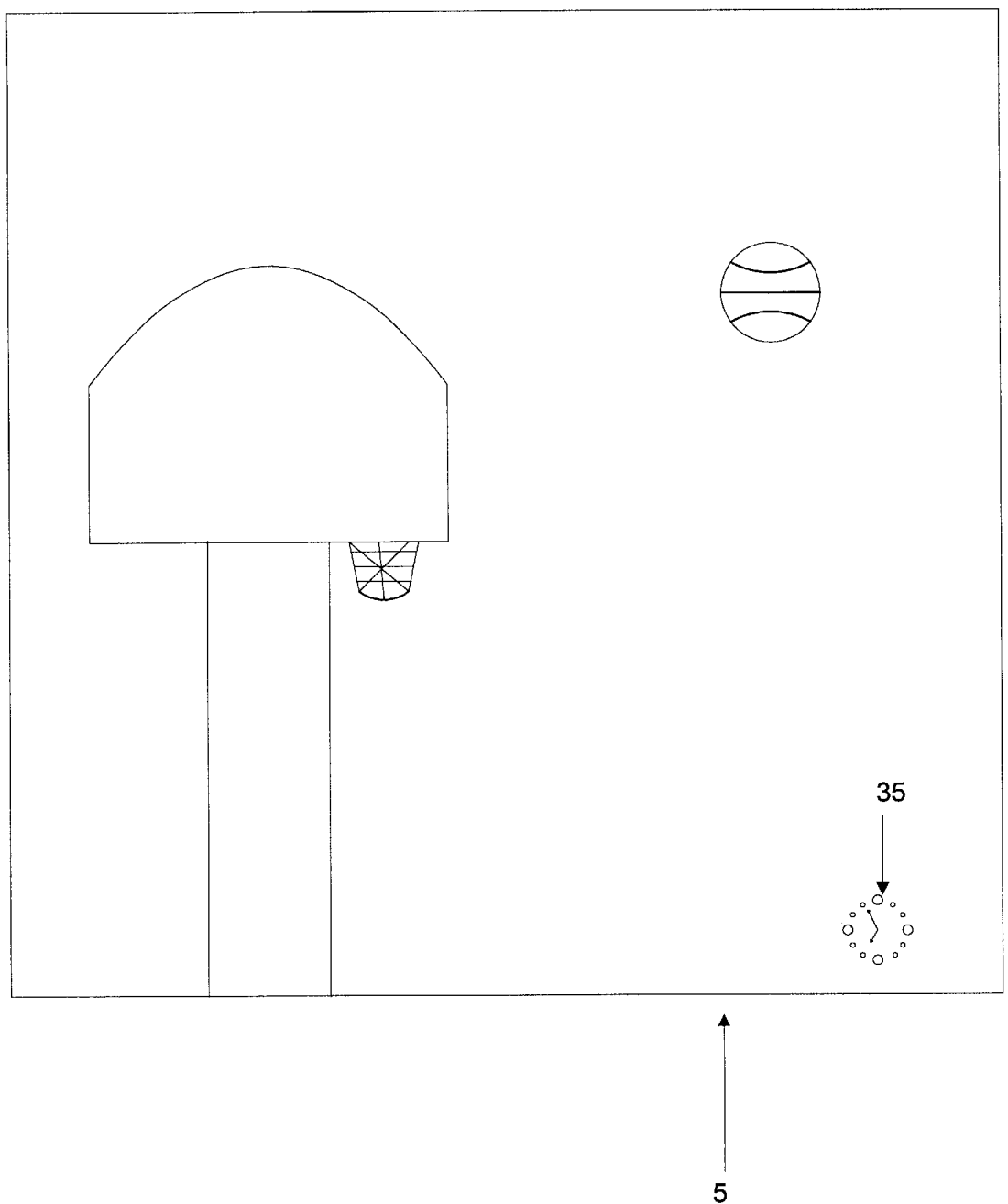
FIG. 5 illustrates an analog clock displayed on a television set.

FIG. 5 illustrates the result of this example. An analog clock 35 remains on the screen 5 for five minutes and then it is removed. After thirty minutes, the analog clock 35 returns to the screen 5 for five minutes. This process continues until the clock display function settings are modified. Thus, the user is allowed to tailor the periodic clock display function according to the user's needs and desires.

Many variations of the present invention may be implemented. For instance, the type of option menus used and the progression through the menus may be changed. Examples of other options include: allowing the user to select the size and/or location of the clock display, showing the seconds or a second hand, having a preset first or second time interval and allowing the user to select the other time interval, or manually removing the clock display before the first time interval is finished. Other embodiments of the present invention include, but are not limited to: a computer, computer monitor, laptop computer, PDA, DVD viewer, VCR, web television controller, cable/satellite television controller, or other similar devices.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for displaying a clock on a viewing device comprising:

displaying options for a clock display function;

determining selected clock display options; and intermittently displaying the clock in accordance with the determined clock display options;

wherein the options further comprise an option to turn the clock display function on or off; and wherein the clock display options comprise a first time interval that determines an amount of time the clock is displayed on the viewing device during the intermittently displaying of the clock in accordance with the determined clock display options.

2. The method of claim 1, wherein the clock display options further comprise a second time interval that determines an amount of time where the clock is not displayed between the intermittent displaying of the clock on the viewing device.

3. The method of claim 1, wherein the options further comprise a default option, where the determining the selected clock display options comprises determining that the default option is to be implemented such that the clock is displayed according to default preset clock display time parameters.

4. A system for displaying a clock on a viewing device comprising:

a display;

a selection device; and options for setting a periodic clock display function, where the options are displayed on the display;

wherein the options set the periodic clock display function as determined from the selection device such that a clock is periodically displayed on the display according to the periodic clock display function;

wherein the options comprise an option to turn the clock display function on or off, and further comprise clock display time parameters for the clock display function defining the periodic display of the clock;

wherein the clock display time parameters comprise a first time interval that determines an amount of time the clock is displayed on the display when periodically displayed.

5. The system of claim 4, wherein the time parameters further comprise a second time interval parameter that determines an amount to time between clock appearances on the device where the clock is not displayed.

6. The system of claim 5, wherein the options further comprise a default option, wherein when the default option is selected, the clock is displayed according to default preset clock display time parameters.

7. A system for periodically displaying a clock on a television screen, the system comprising:

a television display screen;

a device for generating a clock display, and for setting clock display options;

a selection device; and options for setting a periodic clock display function, the options comprising:

a first time interval parameter that determines an amount of time the clock is displayed on the television display screen; and a second time interval parameter that determines an amount of time between clock appearances on the television display screen when the clock is not displayed such that the clock is periodically displayed on the television display screen.

8. The system of claim 7, wherein the device is a set-top box.

9. A method for displaying a clock on a viewing device comprising:

displaying options for a clock display function;

determining selected clock display options; and intermittently displaying the clock in accordance with the determined clock display options;

wherein the determining the selected clock display options comprises determining a first time interval where the first time interval defines how long the clock is displayed on the viewing device during the intermittently displaying of the clock, and determining a second time interval where the second time interval defines how long the clock is not displayed on the viewing device between the intermittently displaying of the clock.

* * * * *